United States Patent [19]
Kimura et al.

[11] Patent Number: 5,627,443
[45] Date of Patent: May 6, 1997

[54] METHOD OF DRIVING STEPPING MOTOR

[75] Inventors: Makoto Kimura; Junichi Emura; Shinobu Kakizaki; Mitsuo Sasaki, all of Atsugi, Japan

[73] Assignee: Unisia Jecs Corporation, Atsugi, Japan

[21] Appl. No.: 414,426

[22] Filed: Mar. 31, 1995

[30] Foreign Application Priority Data

Apr. 6, 1994 [JP] Japan .................................. 6-068341
Jun. 16, 1994 [JP] Japan .................................. 6-134614

[51] Int. Cl.$^6$ ................................................. H02P 8/00
[52] U.S. Cl. ........................... 318/696; 318/685; 280/707
[58] Field of Search ................................... 318/560–696; 364/424.05, 424.01, 426.01, 508; 280/840, 707, 714, 709, 712; 267/64.11; 188/299

[56] References Cited

U.S. PATENT DOCUMENTS

| | | | |
|---|---|---|---|
| 4,642,544 | 2/1987 | Furumura et al. | 318/696 |
| 5,231,343 | 7/1993 | Nakamura et al. | 318/696 |
| 5,310,027 | 5/1994 | Nakamura et al. | 188/299 |
| 5,398,184 | 3/1995 | Yamaoka et al. | 364/424.05 |
| 5,440,488 | 8/1995 | Yamaoka et al. | 364/424.05 |
| 5,467,280 | 11/1995 | Kimura | 364/424.05 |
| 5,485,377 | 1/1996 | Sasaki et al. | 364/424.05 |

FOREIGN PATENT DOCUMENTS

| | | |
|---|---|---|
| 0581300 | 2/1994 | European Pat. Off. . |
| 3528707 | 2/1986 | Germany . |
| 64-04712 | 10/1989 | Japan . |
| 4-58790 | 2/1992 | Japan . |
| 91/07009 | 5/1991 | WIPO . |

OTHER PUBLICATIONS

Patent Abstracts of Japan, vol. 15, No. 217, Jun. 4, 1991.
Patent Abstracts of Japan, vol. 18, No. 137, Mar. 7, 1994.
Patent Abstracts of Japan, vol. 18, No. 518, Sep. 29, 1994.

*Primary Examiner*—Paul Ip
*Attorney, Agent, or Firm*—Foley & Lardner

[57] ABSTRACT

A method of driving a stepping motor comprises dividing a drive signal for each drive step into a plurality of portions in the direction of a time axis, and controlling the drive signal in connection with the plurality of portions thereof in a way of PWM so as to obtain a pattern of a gradual change in a on-duty ratio of the drive signal.

3 Claims, 14 Drawing Sheets

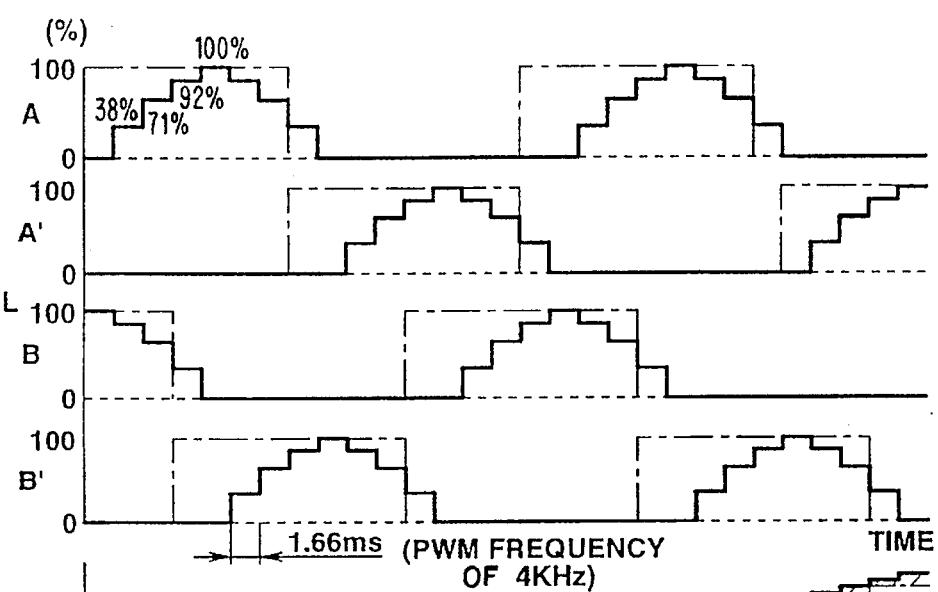

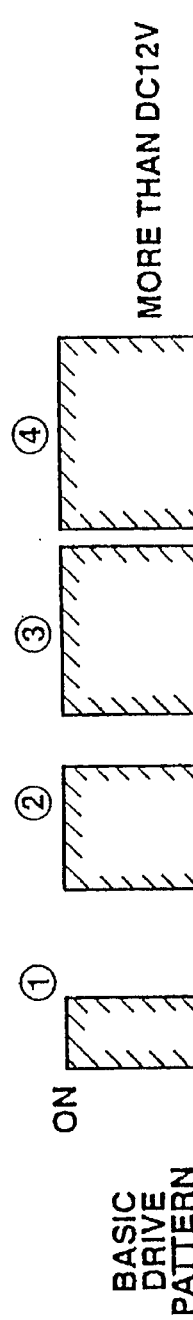
FIG.12A BASIC DRIVE PATTERN
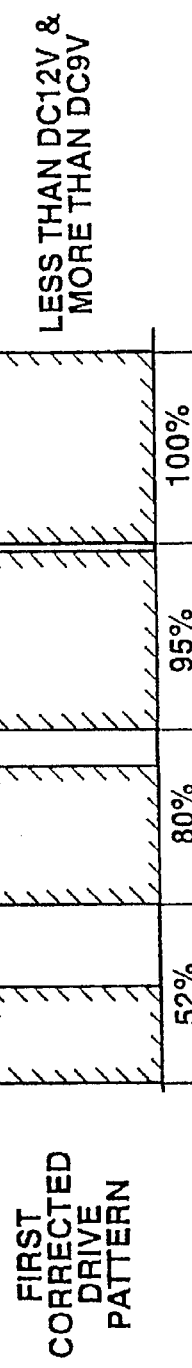
FIG.12B FIRST CORRECTED DRIVE PATTERN
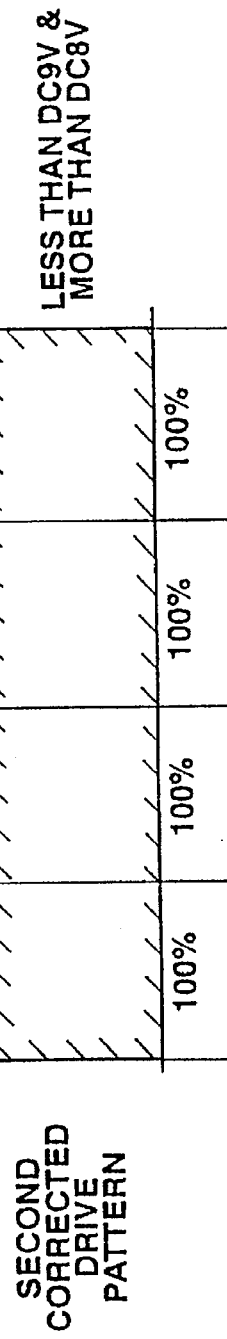
FIG.12C SECOND CORRECTED DRIVE PATTERN

FIG.13

| P \ V (V:SOURCE VOLTAGE) | 8≤V<9 | 9≤V<10 | 10≤V<11 | 11≤V<12 | 12≤V<13 | 13≤V<14 | 14≤V |
|---|---|---|---|---|---|---|---|
| ① | 100 | 65 | 60 | 55 | 38 | 38 | 38 |
| ② | 100 | 85 | 83 | 78 | 71 | 71 | 71 |
| ③ | 100 | 95 | 94 | 93 | 92 | 92 | 92 |
| ④ | 100 | 100 | 100 | 100 | 100 | 100 | 100 |

(P : DRIVE PATTERN)

METHOD OF DRIVING STEPPING MOTOR

BACKGROUND OF THE INVENTION

The present invention relates to a method of driving a stepping motor and more particularly, to a technique of restraining vibration of the stepping motor during drive thereof.

One of conventional methods of driving a stepping motor is disclosed, for example, in JP-A 4-58790. In this reference, upon switching of a waveform of a drive signal for driving stepwise a stepping motor, the on-duty ratio of the drive signal is gradually changed by pulse width modulation (refer hereafter to as PWM) control so as to retrain a settling due to sudden step rotation. By this, the stepping motor has reduced vibration noise during step drive.

However, the above conventional method of driving a stepping motor produces the following inconveniences:

PWM control as adopted in the conventional method is designed to gently carry out a rise of drive current output to the stepping motor by restricting a time duration of supply of the drive signal, so that an average of drive current is lowered at each drive step, resulting in lowered torque of the stepping motor during PWM control. If source voltage of a stepping motor drive circuit is decreased during PWM control, drive torque is lowered further, resulting in a possible erroneous operation of the stepping motor due to the relationship between load and drive torque. By way of example, when the stepping motor serves as an actuator for driving damping-force-characteristic varying means of a variable-damping-force-type shock absorber for a motor vehicle, the damping-force-characteristic varying means undergo a load based on a fluid force. Thus, if source voltage of the stepping motor drive circuit is lowered during PWM control due to a great variation in source voltage according to a service of the other electric devices in the motor vehicle, etc., and/or the stepping motor undergoes a great load suddenly, the stepping motor is out of good operation, resulting in erroneous control. It is noted that a variation in source voltage can be corrected by providing a constant current circuit based on feedback control of current, which produces, however, another inconvenience of a cost increase due to the complicated circuit structure and increased number of parts.

Moreover, according to the conventional method, the stepping motor is driven smoothly only in an initial portion of each drive step, but driven stepwise in accordance with the drive signal in the same way as in the prior art, failing to fully eliminate vibration of the stepping motor during step drive thereof.

When driving the stepping motor for driving damping-force-characteristic varying means of a variable-damping-force-type shock absorber, a waveform of damping force has disarrayed portions due to intermittent switching of a damping-force characteristic, which is therefore increased with an enlargement of the width of each drive step of the stepping motor 3.

It is, therefore, an object of the present invention to provide a method of driving a stepping motor which enables a prevention of an erroneous operation of the stepping motor and a restraint of occurrence of vibration of the stepping motor during step drive thereof.

SUMMARY OF THE INVENTION

According to one aspect of the present invention, there is provided a method of driving a stepping motor having a plurality of drive steps, the stepping motor being driven by a drive signal, the method comprising the steps of:

dividing the drive signal for each drive step into a plurality of portions in a direction of a time axis;

controlling the drive signal in connection with said plurality of portions thereof in a way of PWM so as to obtain a pattern of a gradual change in a on-duty ratio of the drive signal; and supplying the drive signal as controlled to the stepping motor.

Another aspect of the present invention lies in providing, in a motor vehicle:

a shock absorber including means for varying a damping-force characteristic; and a stepping motor mounted to said shock absorber at one end thereof, said stepping motor serving to drive said damping-force characteristic varying means of said shock absorber, said stepping motor having a plurality of drive steps and being driven by a drive signal, said stepping motor being driven in accordance with a method comprising the steps of:

dividing said drive signal for each drive step into a plurality of portions in a direction of a time axis;

controlling said drive signal in connection with said plurality of portions thereof in a way of PWM so as to obtain a pattern of a gradual change in a on-duty ratio of said drive signal; and supplying said drive signal as controlled to said stepping motor.

BRIEF DESCRIPTION OF THE DRAWINGS

FIGS. 5A and 5B are views similar to FIG. 4B, showing the on-duty ratio of a drive signal at each divided drive step and the state of step drive of the stepping motor (in a basic drive pattern), respectively;

FIGS. 12A–12C are graphs showing the on-duty ratios of the drive signal in the basic drive pattern, the first corrected drive pattern, and the second corrected drive pattern, respectively;

FIG. 13 is a map illustrating a switching characteristic of the drive-patterns with a variation in source voltage in a third embodiment of the present invention;

DETAILED DESCRIPTION OF THE INVENTION

Figure 1:
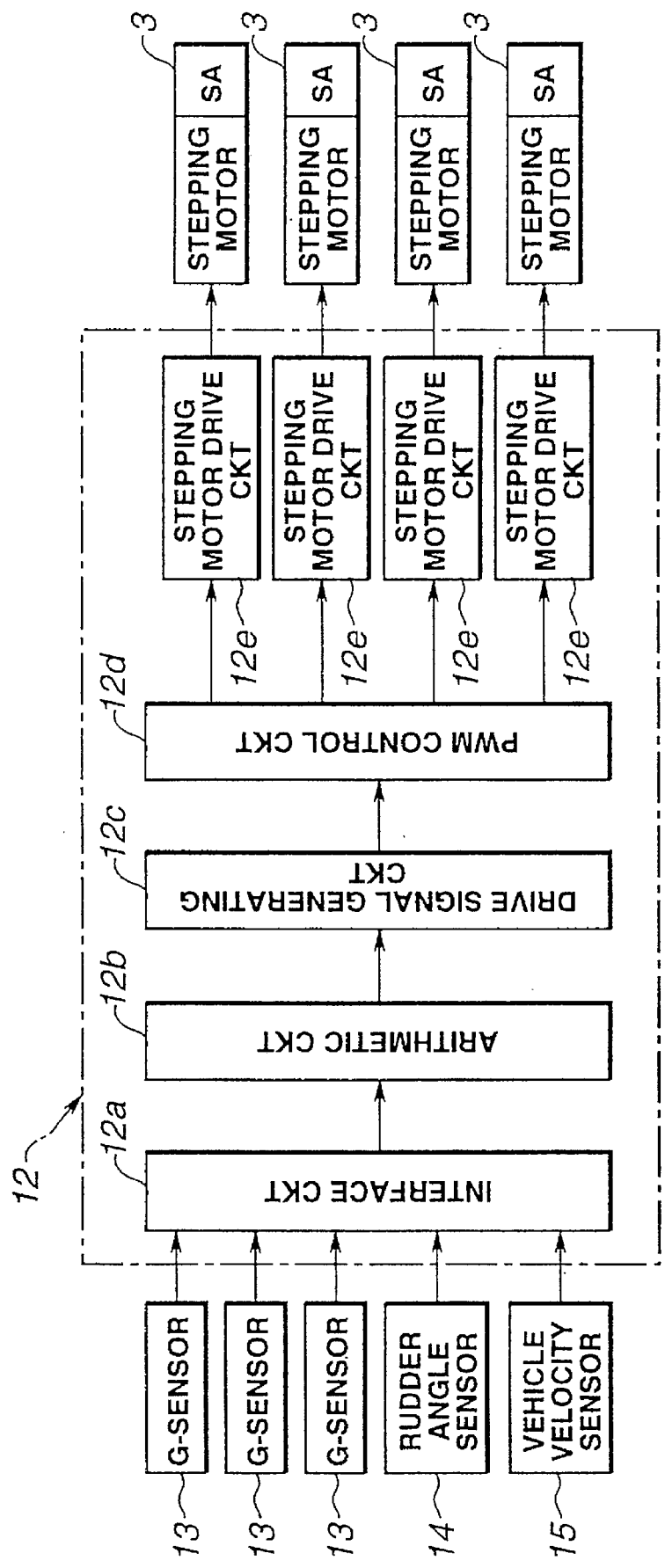
FIG. 1 is a block diagram showing a first embodiment of a method of driving a stepping motor for driving damping-force-characteristic varying means of a variable-damping-force-type shock absorber for a motor vehicle.

Referring to the drawings wherein like reference numerals designate like parts throughout the views, a description will be made with regard to preferred embodiments of a method of driving a stepping motor according to the present invention.

FIGS. 1–6 show a first embodiment of the present invention. Referring first to FIG. 1, a method of the present invention is applied to a stepping motor 3 for driving damping-force-characteristic varying means of a variable-damping-force-type shock absorber SA.

Figure 2:
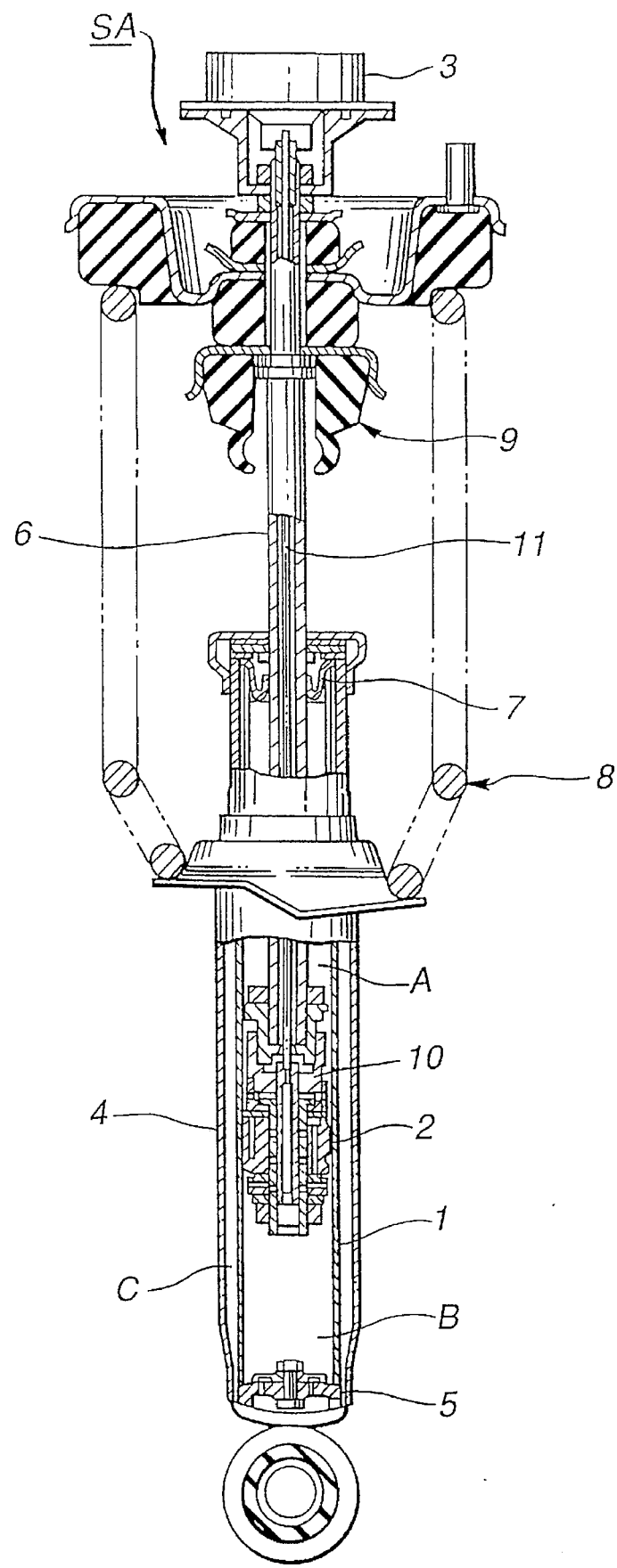
FIG. 2 is a sectional view showing the variable-damping-force-type shock absorber.

Referring to FIG. 2, the shock absorber SA is provided with a cylinder 1, a piston 2 serving to define an upper chamber A and a lower chamber B of the cylinder 1, an outer tube 4 serving to form a reservoir chamber C on the outer periphery of the cylinder 1, a base 5 serving to define the lower chamber B and the reservoir chamber C, a guide member 7 serving to slidably guide a piston rod 6 connected to the piston 2, a suspension spring 8 interposed between the outer tube 4 and a vehicular body (not shown), and a bumper rubber 9. Moreover, a rotary valve 10 as damping-force-characteristic varying means is arranged in the piston rod 6, and the stepping motor 3 is mounted to the shock absorber SA at the upper end thereof so as to drive stepwise the rotary valve 10 through a control rod 11.

Figure 3:
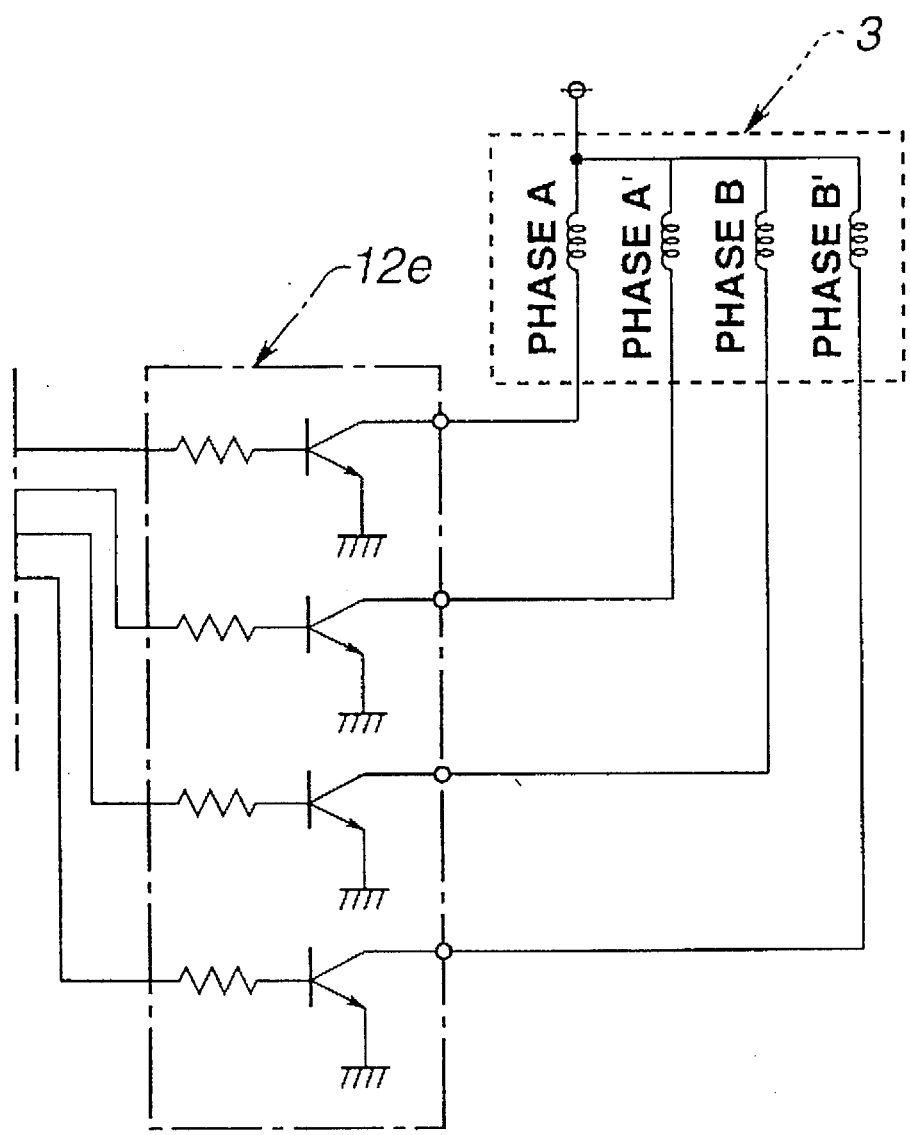
FIG. 3 is a circuit diagram showing the stepping motor and a drive circuit thereof.

Referring to FIG. 3, the stepping motor 3 is of a type of unipolar four-phase drive and 2—2 phase excitation.

Referring again to FIG. 1, a control unit 12 comprises an interface circuit 12a, an arithmetic circuit 12b, a drive signal generating circuit 12c, a PWM control circuit 12d, and a stepping motor drive circuit 12e.

Input to the interface circuit 12a are signals out of an acceleration sensor or G-sensor 13, a rudder-angle sensor 14, and a vehicular velocity sensor 15. The arithmetic circuit 12b is arranged to obtain control signals for optimally controlling a damping-force characteristic of the shock absorber SA of a motor vehicle in accordance with the signals out of the interface circuit 12a.

The drive signal generating circuit 12c is arranged to output a drive signal for driving stepwise the stepping motor 3 of the shock absorber SA to a target step position in accordance with the control signals input from the arithmetic circuit 12b.

The PWM control circuit 12d is arranged to divide, for each drive step, the drive signal input from the drive signal generating circuit 12c into four in the direction of a time axis, each being subjected to PWM control so that the on-duty ratio of the drive signal at each drive step is increased or decreased stepwise, which is supplied to the stepping motor drive circuit 12e.

Figures 4A, 4B:
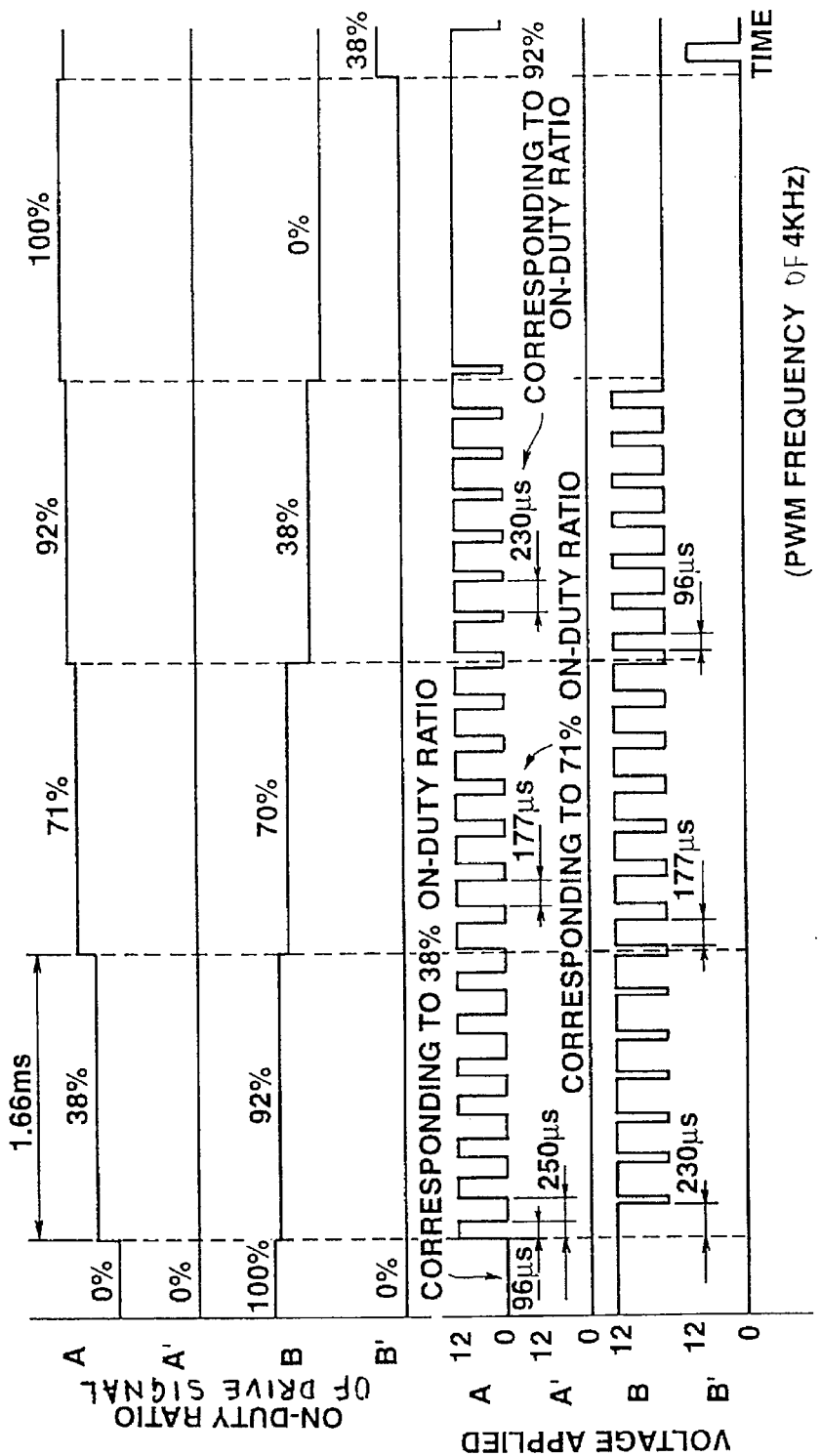
FIGS. 4A and 4B are time charts showing the on-duty ratio of a drive signal and applied voltage at each divided drive step with respect to the phases A, A', B, and B', respectively.

Referring to FIGS. 4A and 4B, time charts show the on-duty ratio of the drive signal and applied voltage at each divided drive step with respect to the phases A, A', B, and B', respectively. In this embodiment, the on-duty ratio of the drive signal at each divided drive step is set to 0%, 38%, 71% 92% and 100%, and can be thus switched in four grades between 0% and 100%. Moreover, the on-duty ratio can be subdivided in four grades for each drive step by a stepwise increase from 0% at the phase A, and a stepwise decrease from 100% at the phase B.

Referring to FIG. 5A, a fully-drawn line shows in a bar graph the on-duty ratio (0%, 38%, 71%, 92%, and 100%) of the drive signal at each divided drive step. As shown in FIG. 5A, each drive step is partitioned equally so that the on-duty ratio has a waveform similar to a sine wave, and the phases A and B are shifted by 90° with each other. By this, referring to FIG. 5B, as indicated by a fully-drawn line, a rotor of the stepping motor 3 can be held by ¼ a conventional step drive pitch as indicated by a one-dot chain line due to a balance with applied current or magnetic force. That is, the width of each drive step can be reduced to ¼ the conventional step drive pitch, resulting in a great restraint of vibration generated during drive of the stepping motor 3.

Figure 6:
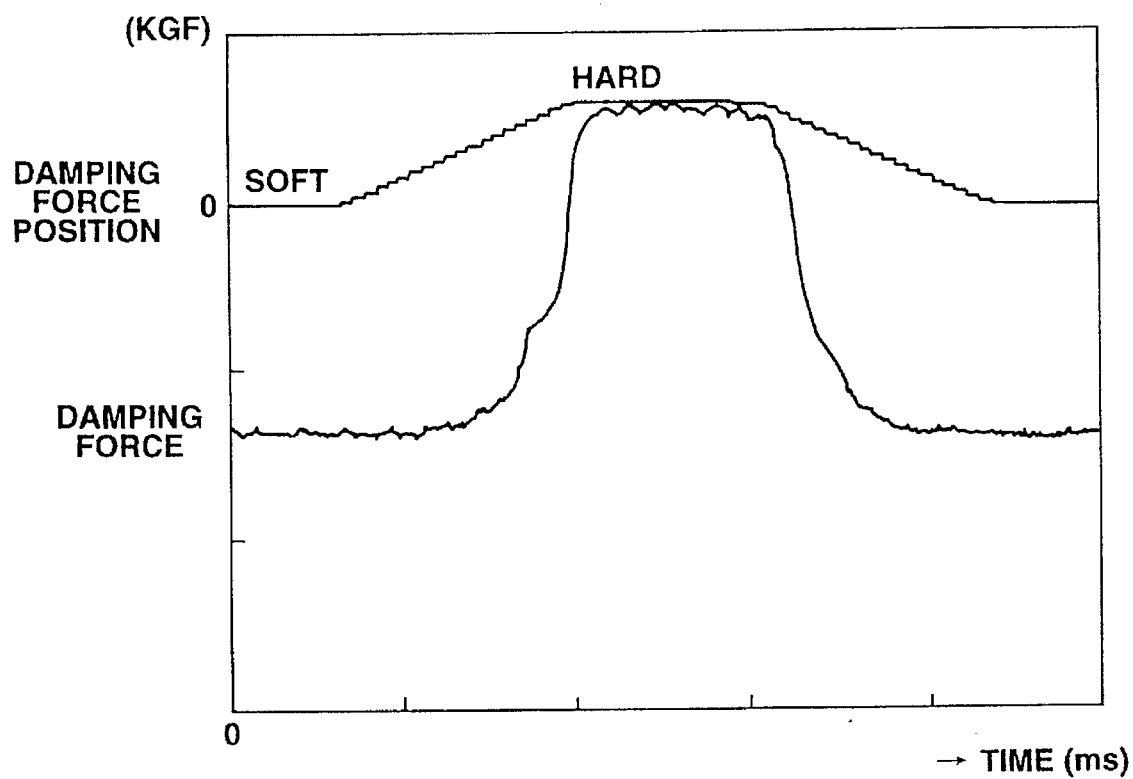
FIG. 6 is a waveform chart of damping force when driving the stepping motor according to the method of the present invention.

Referring to FIG. 6, a time chart shows a waveform of damping force when driving the stepping motor 3 according to the method of the present invention. As seen from FIG. 6, when a position of the damping-force-characteristic varying means of the shock absorber SA is shifted from a soft position to a hard position, the waveform of damping force has no disarrayed portion.

As described above, the above method of driving the stepping motor 3 produces the following effects:

1) Vibration generated during drive of the stepping motor 3 can be largely restrained, resulting in a reduced level of noise transmitted in a vehicular room; and 2) Switching of a damping-force characteristic is carried out in subdivided steps, having no disarrayed portion of the waveform of damping force.

Figure 7:
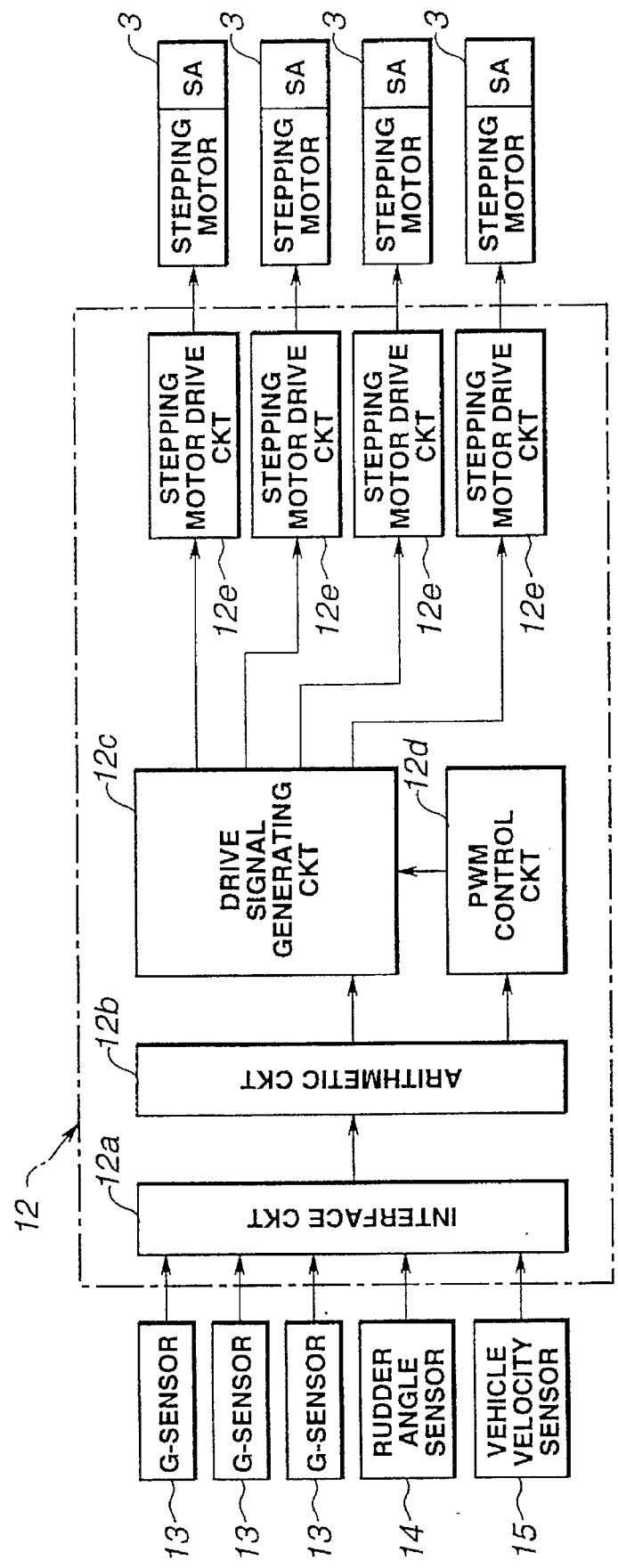
FIG. 7 is a view similar to FIG. 1, showing a variant of a control unit in the first embodiment.
Figure 8:
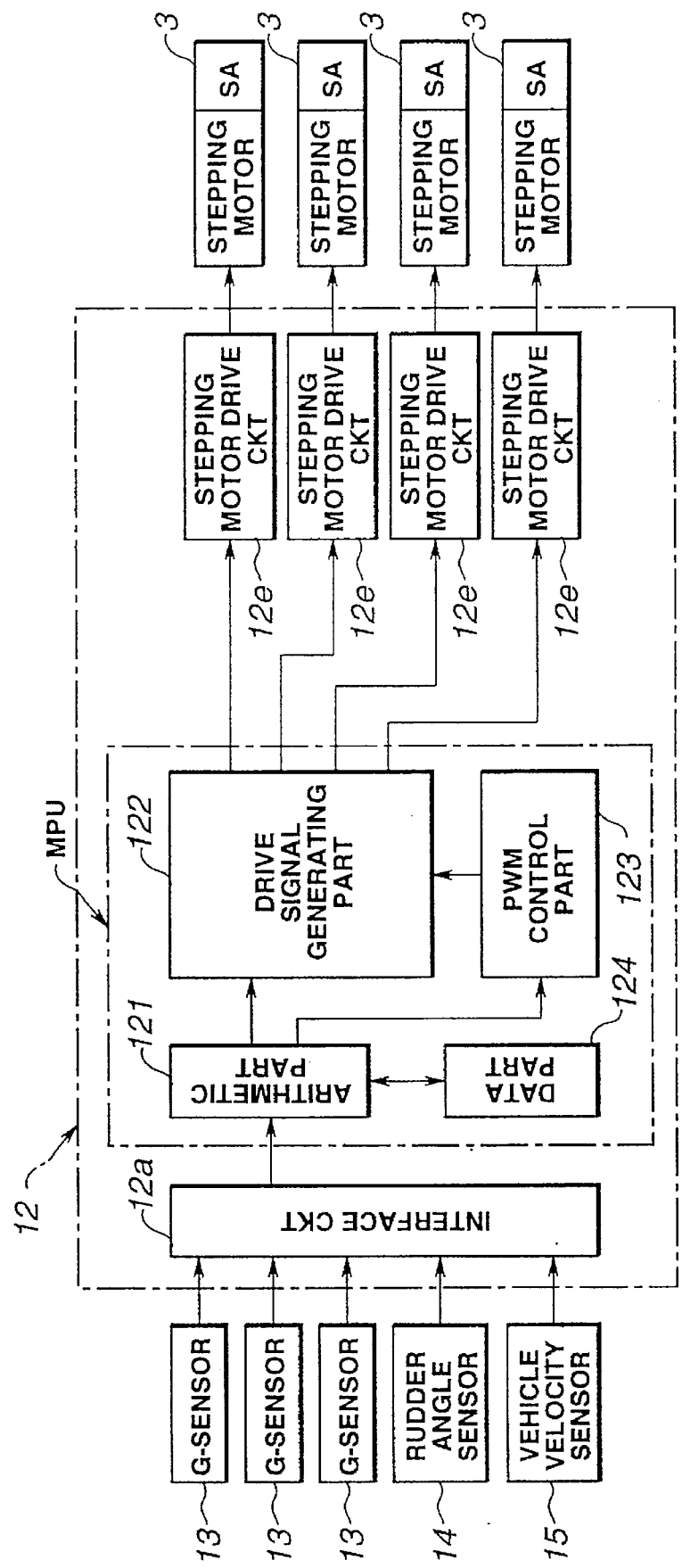
FIG. 8 is a view similar to FIG. 7, showing another variant of the control unit.

It is noted that in place of the control unit 12 as shown in FIG. 1, the control unit 12 as shown in FIG. 7 may be used wherein the arithmetic circuit 12b provides signals to both drive signal generating circuit 12c and PWM control circuit 12d, and the PWM control circuit 12d provides a signal to the drive signal generating circuit 12c so as to correct a drive signal thereof. Moreover, the control unit 12 may be as shown in FIG. 8, comprising a software having an arithmetic part 121, a drive signal generating part 122, a PWM control part 123, and a data part 124 arranged in a micro processing unit (MPU), which enables a great reduction in system cost.

Figure 9:
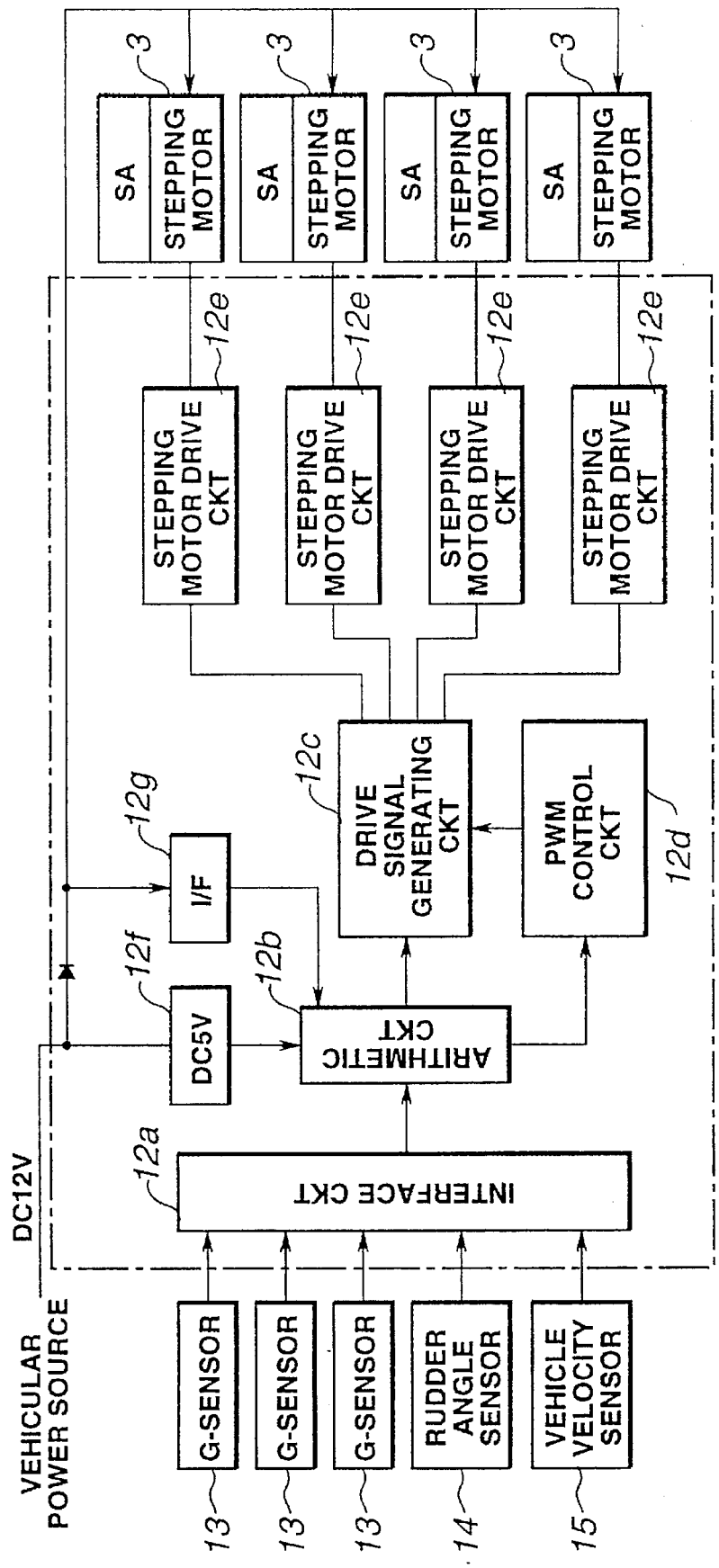
FIG. 9 is view similar to FIG. 8, showing a second embodiment of the present invention.

FIGS. 9–12C show a second embodiment of the present invention, which is substantially the same as the first embodiment. Referring to FIG. 9, the control unit 12 comprises the interface circuit 12a, arithmetic circuit 12b, drive signal generating circuit 12c, PWM control circuit 12d, and stepping motor drive circuit 12e.

A vehicular power source of DC 12V is connected to the stepping motor 3, and voltage of DC 5V obtained from the vehicular power source through a transformer circuit 12f is supplied to the arithmetic circuit 12b. Voltage supplied to the stepping motor 3 or source voltage is detected by a voltage detector circuit 12g, and fed back to the arithmetic circuit 12d.

Input to the interface circuit 12a are signals out of the acceleration sensor or G-sensor 13, rudder-angle sensor 14, and vehicular velocity sensor 15, and brake sensor 16. The arithmetic circuit 12b is arranged to obtain control signals for optimally controlling a damping-force characteristic of the shock absorber SA in accordance with the signals out of the interface circuit 12a.

The drive signal generating circuit 12c is arranged to output a drive signal for driving stepwise the stepping motor 3 of the shock absorber SA to a target step position in accordance with the control signals input from the arithmetic circuit 12b.

The PWM control circuit 12d is arranged to divide, for each drive step, the drive signal input from the drive signal generating circuit 12c into four in the direction of a time axis, each being subjected to PWM control so that the on-duty ratio of the drive signal at each drive step is increased or decreased stepwise, which is supplied to the stepping motor drive circuit 12e.

Moreover, the arithmetic circuit 12b serves to carry out selection control of a drive pattern of the drive signal that the PWM control circuit 12d provides to the drive signal generating circuit 12c in accordance with a variation in source voltage fed back from the voltage detector circuit 12g. Specifically, when voltage supplied to the stepping motor S or source voltage is greater than DC 12V, selective switching control is carried out to a basic drive pattern, whereas when the voltage is smaller than DC 12V and greater than DC 9V, selective switching control is carried out to a first corrected drive pattern. Moreover, when the voltage is smaller than DC 9V and greater than DC 8V, selective switching control is carried out to a second corrected drive pattern.

First, the basic drive pattern upon normal source voltage will be described. Referring again to FIGS. 4A and 4B, the time charts show the on-duty ratio of the drive signal and applied voltage at each divided drive step with respect to the phases A, A', B, B', respectively. In the basic drive pattern, the on-duty ratio of the drive signal at each divided drive step is set to 0%, 38%, 71%, 92%, and 100%, and can be thus switched in four grades between 0% and 100%. Moreover, the on-duty ratio can be subdivided in four grades for each drive step by a stepwise increase from 0% at the phase A, and a stepwise decrease from 100% at the phase B. As shown in FIGS. 4A and 4B, this embodiment has four divisions of the drive signal in each divided drive step, with a sampling period of 6.66 ms and a chopping frequency of 4 KHz, so that a time duration of one division of the drive signal and the number of switching or repetition of turn-on and turn-off are as follows:

Time duration of one division: 6.66÷4=1.665 ms

Number of switching: 1.665÷0.25=6.66 times (note that one cycle of 4 KHz is 0.25 ms)

Referring again to FIG. 5A, the fully-drawn line shows in a bar graph the on-duty ratio (0%, 38%, 71%, 92%, and 100%) of the drive signal at each divided drive step. As shown in FIG. 5A, each drive step is partitioned equally so that the on-duty ratio has a waveform similar to a sine wave, and the phases A and B are shifted by 90° with each other. By this, referring to FIG. 5B, as indicated by a fully-drawn line, a rotor of the stepping motor 3 can be held by ¼ a conventional step drive pitch as indicated by a one-dot chain line due to a balance with applied current or magnetic force. That is, the width of each drive step can be reduced to ¼ the conventional step drive pitch, resulting in a great restraint of vibration generated during drive of the stepping motor 3.

Referring again to FIG. 6, the time chart shows a waveform of damping force when driving the stepping motor 3 according to the method of the present invention. As seen from FIG. 6, when a position of the damping-force-characteristic varying means of the shock absorber SA is shifted from a soft position to a hard position, the waveform of damping force has no disarrayed portion.

Next, the corrected drive patterns upon source voltage lowered will be described.

Figure 10:
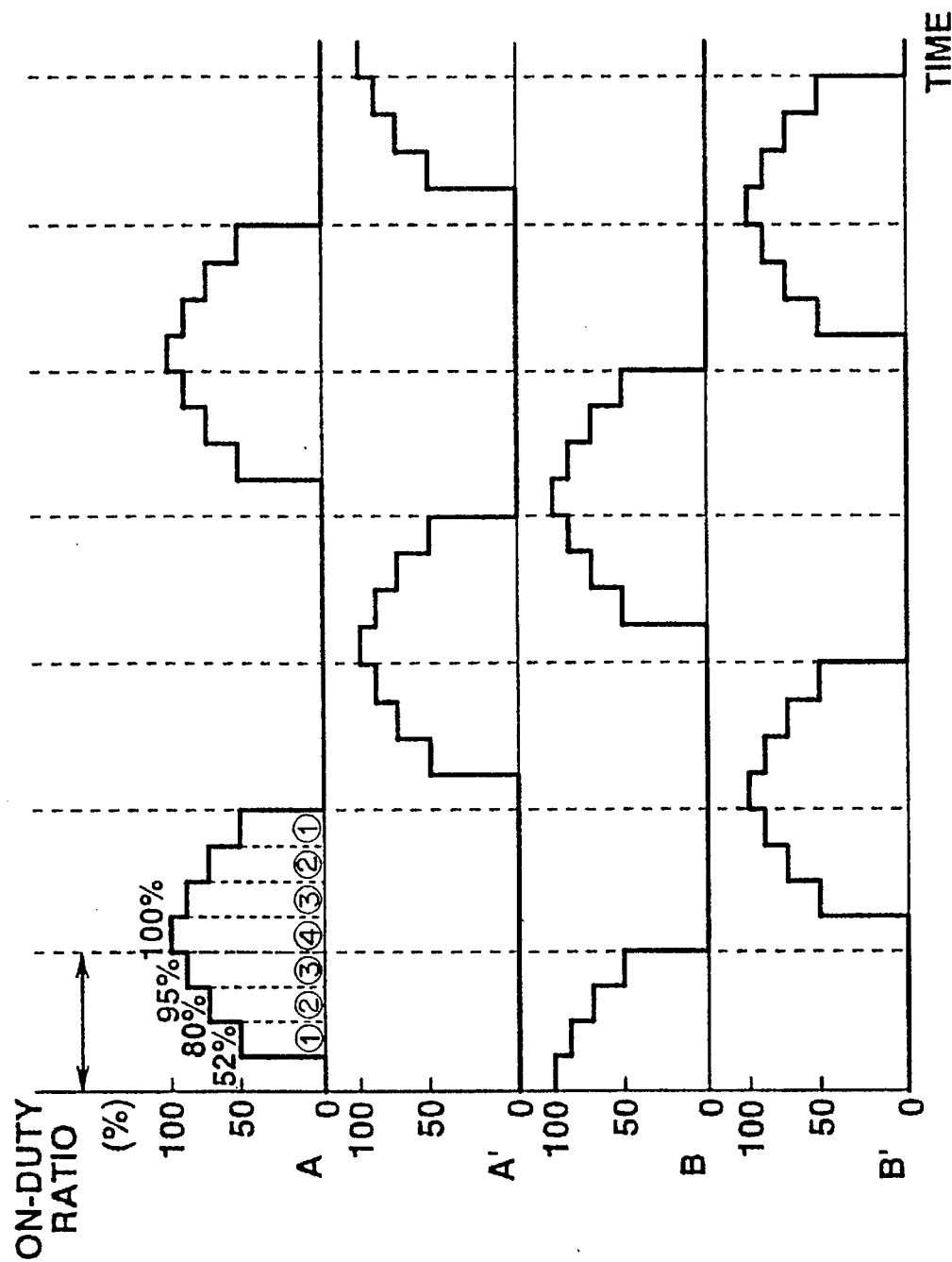
FIG. 10 is a view similar to FIG. 5B, showing the on-duty ratio of the drive signal in a first corrected drive pattern.

In the first corrected drive pattern, the on-duty ratio of the drive signal at each divided drive step is set to 0%, 52%, 80%, 95%, and 100%. FIG. 10 shows in a bar graph the on-duty ratio (0%, 52%, 80%, 95%, and 100%) of the drive signal at each divided drive step. As seen from FIG. 10, the initial on-duty ratio is increased as compared with the basic drive pattern to have the shape similar to a rectangle as a whole, obtaining an increased average of drive current at each divided drive step.

Figure 11:
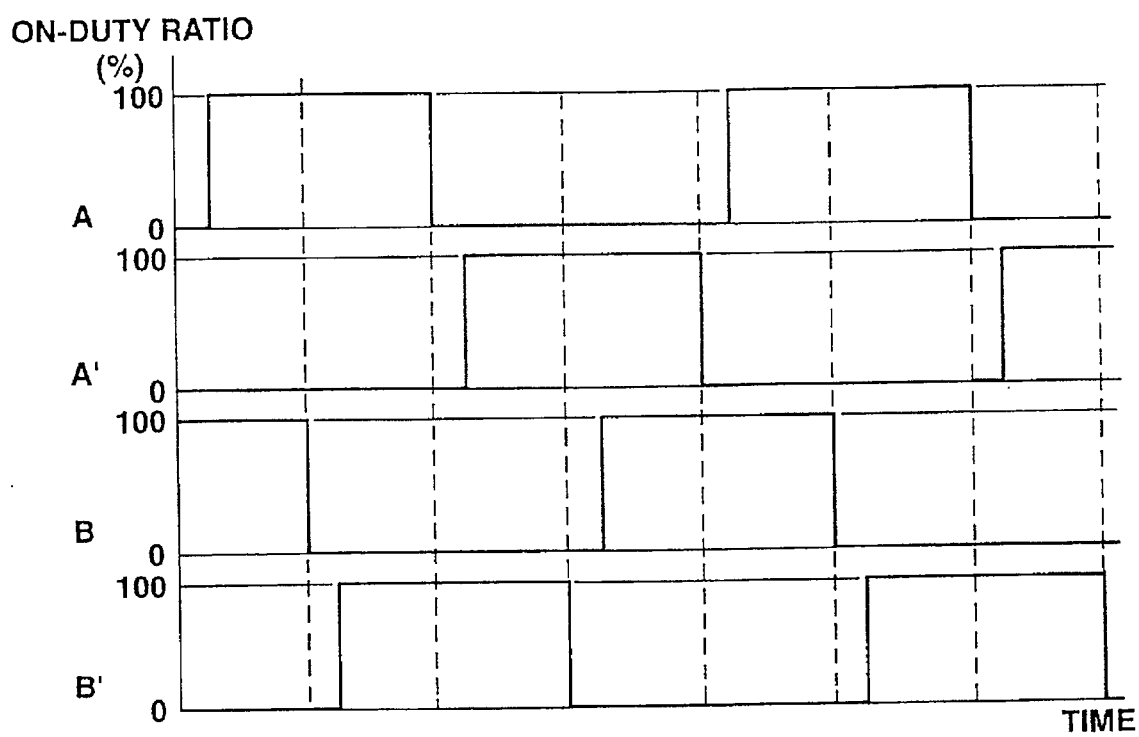
FIG. 11 is a view similar to FIG. 10, showing the on-duty ratio of the drive signal in a second corrected drive pattern.

In the second corrected drive pattern, referring to FIG. 11, in order to obtain a further increased average of drive current at each divided drive step, the on-duty ratio of the drive signal is set to 100% simply. That is, PWM control of the drive signal in the PWM control circuit 12d is stopped.

Referring to FIGS. 12A–12C, graphs show the on-duty ratios of the drive signal in the above drive patterns at each divided drive step thereof. Specifically, FIG. 12A illustrates the basic drive pattern, FIG. 12B illustrates the first corrected drive pattern, and FIG. 12C illustrates the second corrected drive pattern.

Therefore, upon source voltage lowered, since selective switching control is carried out to the first corrected drive pattern or the second corrected drive pattern in accordance with a degree of lowering S of source voltage, a decrease in torque generated by source voltage lowered can be corrected by an increase in an average of drive current.

As described above, the above method of driving the stepping motor 3 produces the following effects:

1) An erroneous operation of the stepping motor S due to source voltage lowered can be prevented during PWM control;

2) Vibration generated during drive of the stepping motor S can be largely restrained, resulting in a reduced level of noise transmitted in a vehicular room; and 3) Switching of a damping-force characteristic is carried out in subdivided steps, having no disarrayed portion of the waveform of damping force.

Third, fourth, and fifth embodiments of the present invention will be described, which are substantially the same as the second embodiment.

Referring to FIG. 13, in the third embodiment, in accordance with a map of switching of the four drive patterns P with a variation in source voltage V, the on-duty ratio (%) of the drive signal is switched in seven grades in place of three grades in the second embodiment.

In the fourth embodiment, the on-duty ratios (4) of the drive signal in the four drive patterns are obtained out of the formulae (1)–(4):

1) $D_1 = -K_1 \cdot V + \alpha$ (1)

2) $D_2 = -K_2 \cdot V + \beta$ (2)

3) $D_3 = -K_3 \cdot V + \gamma$ (3)

Figure 14:
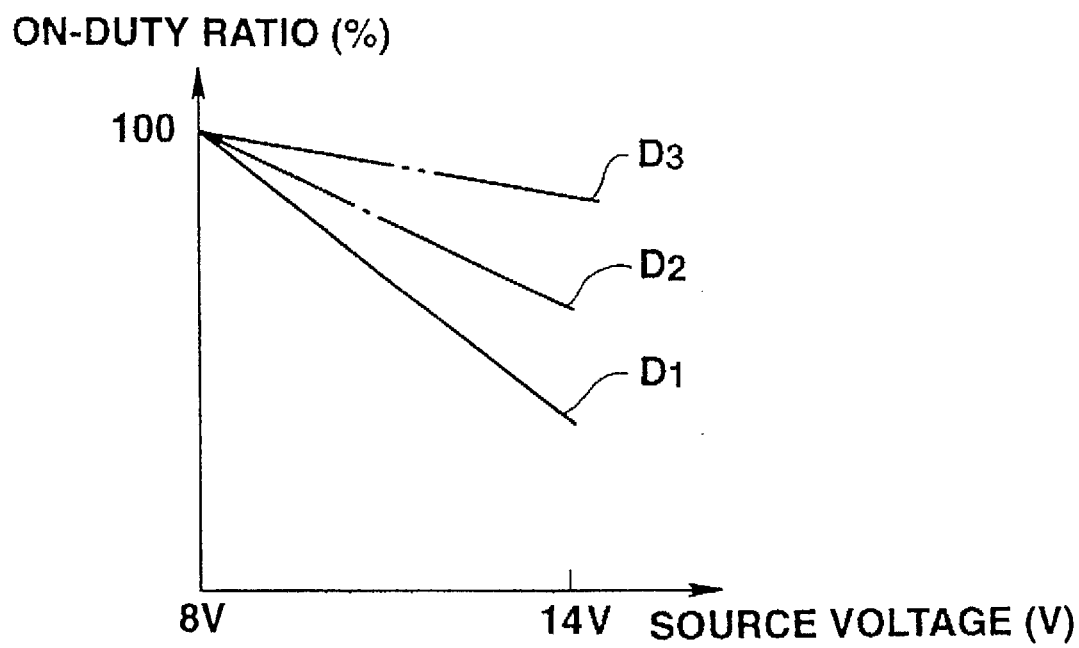
FIG. 14 is a graph showing a variable characteristic of the on-duty ratio of the drive signal with respect to source voltage in a fourth embodiment of the present invention.

4) $D_4 = 100$ (4)

wherein $\alpha, \beta$, and $\gamma$ are fundamental coefficients, and $K_1$, $K_2$, and $K_3$ are correction coefficients in accordance with source voltage V. Referring to FIG. 14, each coefficient is established to a value which ensures a variable characteristic of the on-duty ratio of the drive signal with respect to source voltage V as indicated by $D_1$, $D_2$ or $D_3$.

Figure 15:
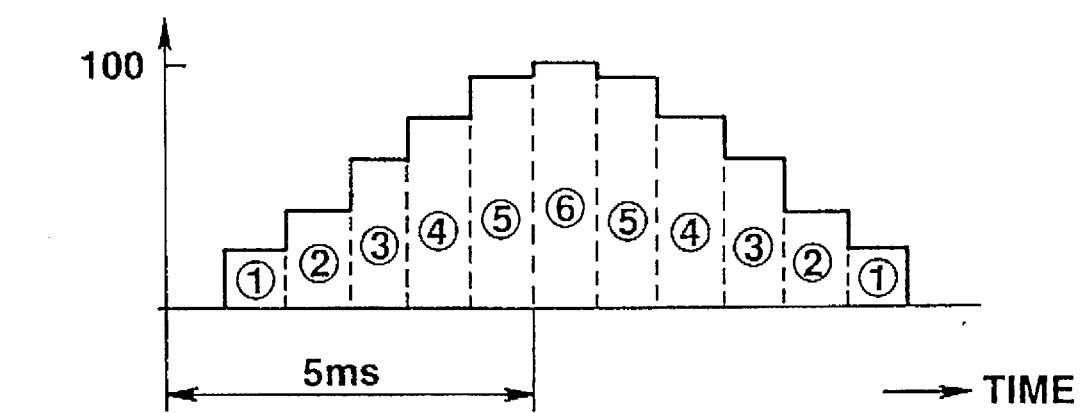
FIG. 15 is a view similar to FIG. 11, showing the divided state of the drive signal in a fifth embodiment of the present invention.

Referring to FIG. 15, the fifth embodiment has six divisions of the drive signal in each divided drive step, with a sampling period of 5 ms and a chopping frequency of 8 KHz in place of four divisions with a sampling period of 6.66 ms and a chopping frequency of 4 KHz in the above embodiments. The increased number of divisions in each divided drive step enables further smoothed drive of the stepping motor 3.

Having described the present invention in connection with the preferred embodiments, it is noted that the present invention is not limited thereto, and various changes and modifications are possible without departing from the spirit of the present invention.

By way of example, in the embodiments, the stepping motor S is of a type of unipolar four-phase drive and 2—2 phase excitation. Alternatively, the stepping motor of the other type may be used.

Moreover, in the embodiments, the present invention is applied to PWM control carried out at each drive step in its entirety. Alternatively, the present invention is applicable to PWM control carried out simply in an initial portion of each drive step.

What is claimed is:

1. A method of driving a stepping motor for driving means for varying a damping-force characteristic of a shock absorber, the stepping motor having a plurality of drive steps, the method comprising the steps of:

dividing a drive signal for each drive step of the stepping motor into a plurality of portions in a direction of a time axis;

controlling each portion of said drive signal in a way of PWM so as to obtain a pattern of a gradual change in an on-duty ratio of said each portion of said drive signal, said pattern being dependent on a voltage supplied to the stepping motor; and supplying said each portion of said drive signal as controlled to the stepping motor.

2. In a motor vehicle:

a shock absorber including means for varying a damping force characteristic;

a stepping motor mounted to said shock absorber, said stepping motor serving to drive said damping-force characteristic varying means of said shock absorber, said stepping motor having a plurality of drive steps; and a control unit connected to said stepping motor, said control unit comprising:

means for dividing a drive signal for each drive step of said stepping motor into a plurality of portions in a direction of a time axis;

means for controlling each portion of said drive signal in a way of PWM so as to obtain a pattern of a gradual change in an on-duty ratio of said each portion of said drive signal, said pattern being dependent on a voltage supplied to said stepping motor; and means for supplying each portion of said drive signal as controlled to said stepping motor.

3. A system for driving a stepping motor for driving means for varying a damping-force characteristic of a shock absorber, the stepping motor having a plurality of drive steps, the system comprising:

means for dividing a drive signal for each drive step of the stepping motor into a plurality of portions in a direction of a time axis;

means for controlling each portion of said drive signal in a way of PWM so as to obtain a pattern of a gradual change in an on-duty ratio of said each portion of said drive signal, said pattern being dependent on a voltage supplied to the stepping motor; and means for supplying said each portion of said drive signal as controlled to the stepping motor.

* * * * *